Oct. 20, 1970  J. H. KLUCK  3,535,482
MICROWAVE APPARATUS FOR RAPID HEATING OF FLUIDS
Filed June 26, 1968  2 Sheets-Sheet 2

INVENTOR
JAMES H. KLUCK

United States Patent Office 3,535,482
Patented Oct. 20, 1970

3,535,482
MICROWAVE APPARATUS FOR RAPID HEATING OF FLUIDS
James H. Kluck, Colton, Calif., assignor to Hammtronics Systems, Inc., Pasadena, Calif., a corporation of Delaware
Filed June 26, 1968, Ser. No. 740,177
Int. Cl. H05b 9/06, 5/00
U.S. Cl. 219—10.55                    3 Claims

ABSTRACT OF THE DISCLOSURE

Apparatus for the rapid heating of fluid materials. The apparatus operates on the principle of converting electromagnetic energy into thermal energy within the fluid. The apparatus comprises a length of microwave energy translucent tubing which is passed transversely through a waveguide. The fluid to be heated is directed through the tubing. By choosing the proper frequency of microwave energy directed into and through the waveguide and the proper diameter of tubing, highly efficient and extremely rapid conversion of the electromagnetic energy into the thermal energy within the fluid flowing through the tubing is accomplished.

BACKGROUND OF THE INVENTION

This invention relates to microwave heating and more particularly to a method and apparatus for the rapid heating of fluids to high temperatures in pasteurizing, sterilizing, and concentrating processes.

There are many methods currently in use for heating fluids to temperatures above their boiling point under pressure. This is done in food processing, for example, in sterilizing milk, and concentrating orange juice, and in removing all traces of water products such as oils. One common method is to heat the liquid in a tubular heat exchanger where the heat is transferred to the product through the tubular walls from a heat source which may be steam or some other hot medium. In order to conduct heat into the fluid the inside surface of the tubes must be at a higher temperature than the temperature to which it is desired to raise the fluid. Under this condition the fluid in contact with this surface is heated to a higher temperature than the central region of the fluid and in the case of food products is prone to develop an off flavor.

Furthermore, because of the high temperature which must be employed, the build-up of scale and other solid deposits on the interior surfaces of the tube is encouraged. This not only has an adverse effect on the quality of the material being processed but also inhibits the transfer of heat so that frequent inspection and maintenance is required. A further disadvantage of such apparatus is the inherently long temperature response time preventing rapid corrections for changing conditions.

Another method of raising the temperature of fluids, particularly food stuffs, to high temperatures is by means of steam injection. This provides more rapid and uniform heating than the tubular heat exchanger method, but this advantage is partially offset by the danger of contaminants being introduced through the steam injection system. An additional problem characteristic of the steam injection method is that the moisture introduced into the product by the steam must usually be removed at a later stage of processing, placing an added burden on the processing facilities. Furthermore, the heating times provided by this method, although much shorter than the plate or tube heat exchanger, are still not as short as desired for high temperature-high speed sterilization.

In contrast, in the present invention the fluid being heated does not come into contact with any physical heat exchange mechanism. Instead, heat is generated directly within the product itself by the transformation of electromagnetic energy into thermal energy. This transformation of energy is essentially instantaneous and thus heating is more rapid than with any of the other known methods. Not only is it now possible to heat a fluid to a high temperature in a very short period of time, but also the heating is accomplished in a manner such that it is substantially uniform throughout the fluid. By heating the fluid without the necessity of coming into contact with any physical heat exchange mechanism the heating process is carried out in a completely aseptic manner.

In terms of the apparatus the present invention contemplates an apparatus for heating fluid materials comprising an electric waveguide and means for propagating electromagnetic energy in the waveguide at microwave frequencies. The apparatus also includes a length of tubing passing transversely through the waveguide, the tubing being translucent to microwave electromagnetic energy. Means are also provided for passing the fluid material to be heated through the tubing whereby energy permeating the tubing is converted into thermal energy in the fluid material.

In terms of method the present invention contemplates a process for rapidly heating fluids comprising the steps of locating a length of tubing of a predetermined inner diameter within an electric waveguide in a transverse orientation relative to the longitudinal axis of the waveguide, the tubing being translucent to microwave electromagnetic energy, passing the fluid to be heated through the tubing and propagating electromagnetic energy at predetermined microwave frequencies in said waveguide past said length of tubing to convert the electromagnetic energy into thermal energy in the fluid, thereby rapidly raising the temperature of the fluid to a second predetermined temperature higher than the first temperature. In practicing this process the step of preheating may often be a convenient or economically desirable step; however in other applications the preferred process does not include the preheating step, the entire heating being done by means of microwave energy.

A further advantage of the invention is that there is now provided a heating method and apparatus in which the inside walls of the tubing carrying the fluid become no hotter than the fluid itself so that scaling of the tubing and burning, scorching of non-uniform heating of the fluid and attendant development of off flavors in food products is avoided.

BRIEF DESCRIPTION OF THE FIGURES

The invention may be more fully understood by reference to the accompanying drawings, in which.

DESCRIPTION OF THE PREFERRED EMBODIMENTS

Figure 1:
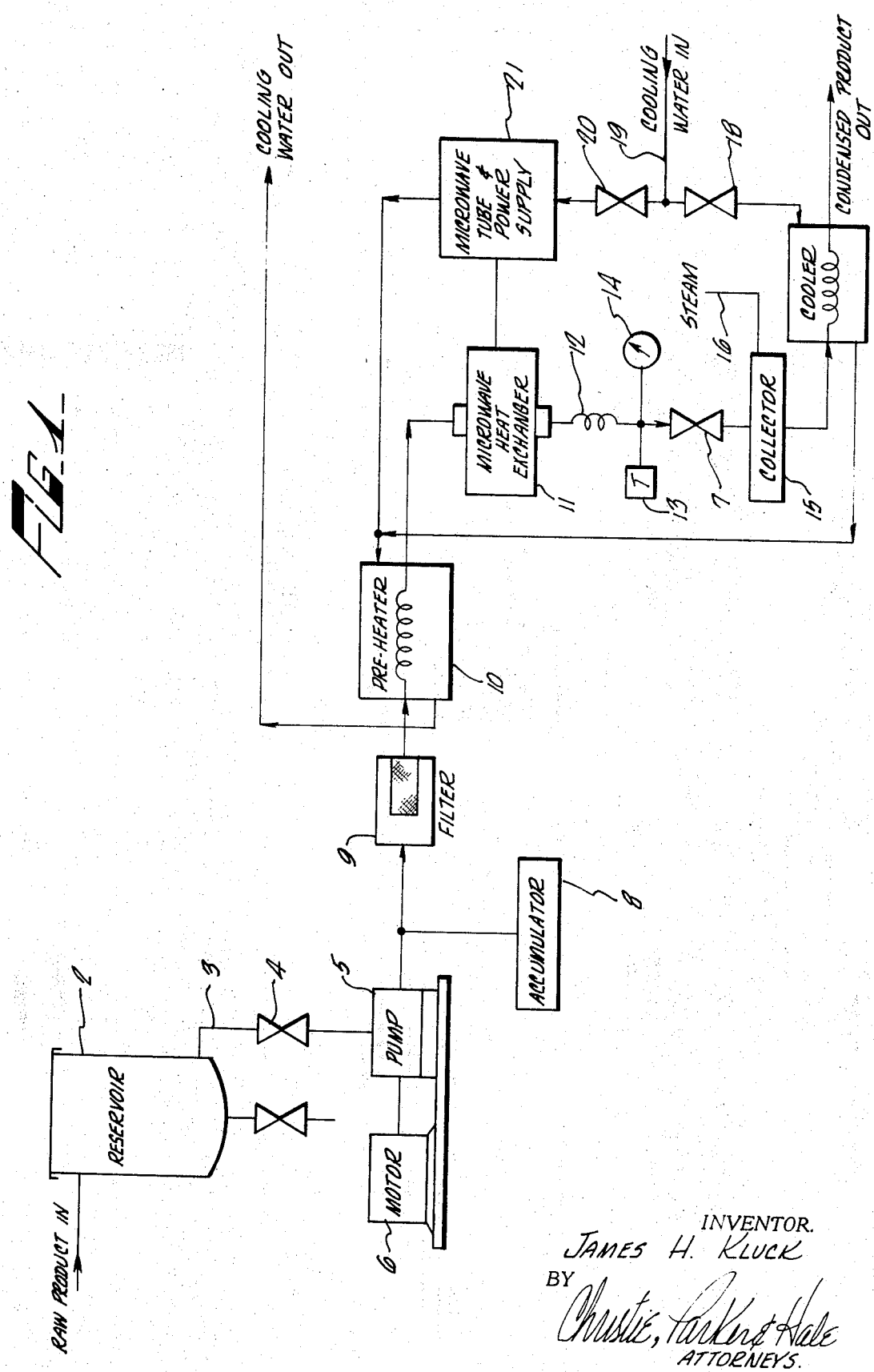
FIG. 1 is a block diagram illustrating the components of a processing system utilizing the heating method and apparatus of the present invention.

Referring to FIG. 1, a typical fluid processing system embodying the present invention, the fluid to be processed enters through pipe 1. For purposes of illustration, this fluid to be processed will be assumed to be a fruit juice. This illustration should not be regarded as limiting the applicability of the invention to fruit juices as the fluid may be other food products such as soup, puree, or other non-food fluid materials. The fruit juice passes into a reservoir 2 and then through a discharge pipe 3 and a shut off valve 4 into a pump 5 which is driven by a motor 6. Pump 5 is preferably a positive displacement pump capable of operating into a high discharge pressure.

The pressure required in the pump discharge line is determined by the pressure required to avoid boiling of the fruit juice or other fluid material at the highest operating temperature in the system with an additional increment of pressure to provide a margin of safety. Typically this temperature is 350° F. At this temperature the vapor pressure of water is 135 p.s.i. and it is desirable that the pressure be maintained at a value of at least 250 p.s.i. pressure. This pressure is set and controlled by a value 7 which preferably is a needle or similar type of valve finely controlled to provide precise regulation of pressure and flow conditions. An accumulator 8 is connected at the outlet of the pump in order to smooth the pressure fluctuations which otherwise might be present due to the cycling nature of the pumping action.

After leaving the pump the fluid product is passed through a filter 9, which blocks the passage of food or foreign particles which might otherwise become lodged within and interfere with the proper operation of the down stream equipment. In this embodiment, the product is then passed through a preheater 10, where it is raised to an outlet temperature of between 130° F. and 200° F. This temperature is determined by the sensitivity of the product to temperature and is set for a particular product at a value which precludes the generation of off flavors or other undesirable effects in the product. The preheater is arranged such that it utilizes waste heat from other portions of the system (as will be described in more detail below) without any additional input energy requirements for the system thus minimizing system operating costs. Other embodiments dispense with the preheating step.

After leaving the preheater the fluid then passes through a microwave heat exchanger 11. In the microwave heat exchanger, which will be discussed more fully below, the product is uniformly and rapidly heated to a temperature in the range of from about 225° to 400° F. as dictated by the objectives of the processing system which objectives may be blanching, concentrating, pasteurization or sterilization. The microwave heat exchanger provides a means of raising the temperature of fluids to any desired final value in a time shorter than that which has heretofore been possible, thus reducing off flavors and fluids in food products in general providing a higher quality of output product from the system regardless of type. With respect to food products, the mechanism by which off flavors are developed are not fully understood, but it is known that the phenomenon is time dependent and that off flavors are reduced by reducing the time of exposure to elevated temperatures.

For each particular food product there is also a required relationship between temperature and the length of time the product is subjected to that temperature in order to fulfill the sterilization requirements. The requirement is flexible and where a large reduction in exposure time is effected only a relatively small increase in exposure temperature is required in order to compensate. For milk as an example, a reduction in time at temperature by a factor of 10 requires only a 25° F. increase in product temperature. High temperature, short time sterilization as practiced in the steam injection method employs exposure time of between 1 and 10 seconds and is limited by steam injection and heat transfer rates. In the method of the present invention exposure times are on the order of 0.1 to 0.01 second. Even shorter exposures may be achieved since the heat is generated essentially instantaneously and uniformly within the product by the transformation of microwave electromagnetic energy to thermal energy.

After passage through the microwave heat exchanger a holding coil 12 may be used to prolong the time at temperature in accordance with a prescribed sterilization time for a particular product. A thermocouple 13 and a pressure gauge 14 are also connected into the line at this point for monitoring and control purposes. The product then passes into a collector 15, which is maintained at a reduced pressure below the vapor pressure of the incoming fluid. A combination of cooling and concentration takes place and the steam released is vented through pipe 16. The amount of water removed and hence the degree of concentration obtained is determined principally by the fluid inlet temperature and pressure within the collector. The typical amount of water removed from a high water content fluid is illustrated by the table below for two collector pressures. The resulting temperature of the fluid in the collector is determined by that vapor pressure. Thus for a particular fluid inlet temperature the amount of concentration obtained can be adjusted by varying the collector pressure.

PERCENT BY WEIGHT OF WATER REMOVED

| Inlet fluid temperature, ° F. | Collector pressure =760 mm. 212° F.) | Collector pressure =420 mm. (100° F.) |
|---|---|---|
| 250 | 3.8 | 15.0 |
| 275 | 6.3 | 17.5 |
| 300 | 8.8 | 20.0 |
| 325 | 11.3 | 22.5 |
| 350 | 12.8 | 25.0 |
| 375 | 16.3 | 27.5 |

If additional cooling is required it may be provided by cooler 17, and the fluid product is then piped into an aseptic canner or bottler or may be subjected to other operations as required. Cooling water for the system enters through pipe 18 to provide a coolant for the microwave tube and power supply 21 and cooler 17, through adjustment valves 19 and 20. After passing through power supply 17, the water which has now been elevated in temperature is piped to preheater 10 to preheat the product entering the heat exchanger.

Figure 2:
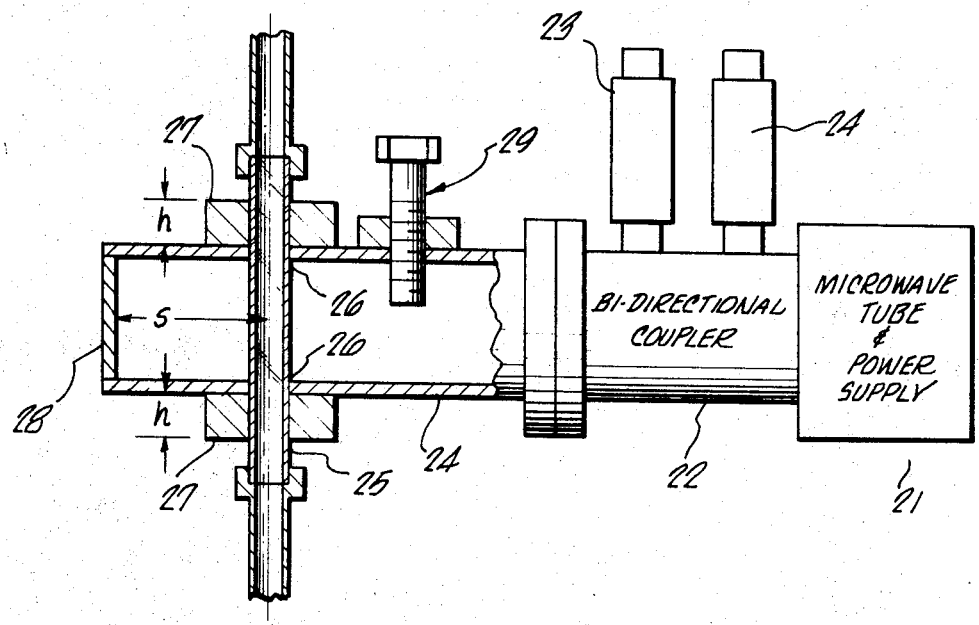
FIG. 2 is a more detailed diagram of the heat exchanger portion of the system of FIG. 1.

In FIG. 2 is shown a more detailed version of microwave heat exchanger 11. It is already known that fluids can be heated by passing the flowing liquid through a glass tube which intersects a waveguide through which microwave energy is propagated. Such a technique is commonly used in the microwave art to measure microwave power by relating the temperature rise of a precisely metered flow of water through a tube to the microwave power incident upon it.

In all such prior methods however in order to accomplish the efficient transfer of energy into the fluid it has been necessary to pass the glass tubing through the waveguide in such a manner that it slants from the inlet end of the waveguide to the outlet end of the waveguide and is many wave lengths long. This has been necessary because the electrical properties of water are such that it is difficult to efficiently transfer microwave power into it. By making the tube sufficiently long and passing it longitudinally through the waveguide from inlet to outlet end, it is possible to transfer energy into the fluid, and to do this over a reasonably wide frequency band width as required for power measuring apparatus.

This method however is generally not satisfactory for industrial rapid heating purposes since the length of the tube precludes the very rapid heating times associated with short time sterilization and other processing operations described previously. Furthermore, the long tube of the prior art is more subject to breakage and hence is less desirable for installation in an industrial type of environment.

It has been found that it is possible to locate a length of tubing of a predetermined inner diameter transversely through a waveguide in a direction parallel to the narrow dimensions of the guide and transverse of the longitudinal axis of the waveguide so that the length of tubing and hence the amount of fluid exposed to the microwave energy at any instant is at a minimum. The tubing is chosen of a material which is translucent to microwave electromagnetic energy. This is done while still effecting essentially complete coupling and hence transfer of energy from the electromagnetic field into the fluid. At room temperature water has a dielectric constant of about 77 and a loss tangent of .13 at a frequency of 2450 megahertz. These values both change as functions of fluid temperature and microwave frequency. Thus it is evident that there exists a considerable problem in effecting a reasonable impedance match into a transverse column of such a fluid. It has been found that the diameter of the fluid column is an important parameter in accomplishing such an impedance match and causing microwave energy to pass into and be absorbed in the fluid and that there is a different and optimum diameter of this fluid column associated with each given set of operating conditions.

Figure 3:
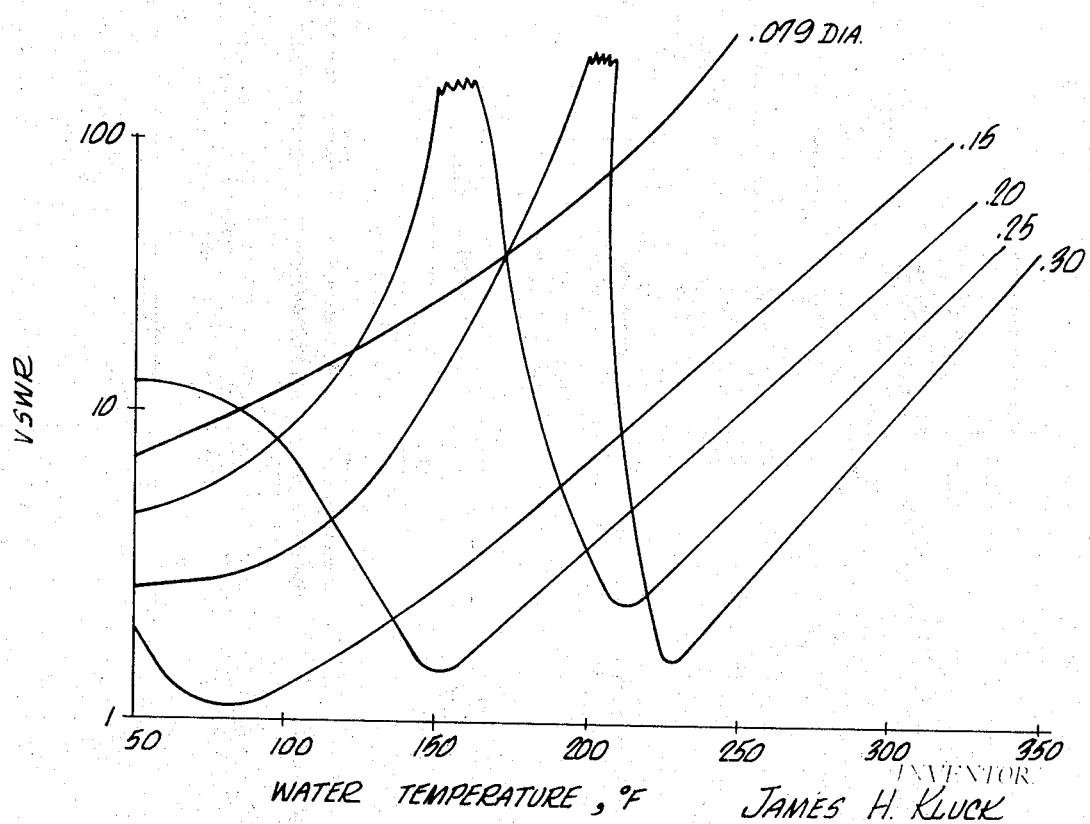
FIG. 3 is a graph showing the voltage standing wave ratio for a waveguide having a column of fluid passing transversely therethrough as a function of fluid temperatures for various fluid column diameters.

In FIG. 3 is shown the results of a theoretical analysis showing the percentage of power [expressed in terms of the voltage standing wave ratio (VSWR)] reflected from water and hence lost as a function of the temperature of the fluid for various column diameters. This analysis is based on having no additional impedance matching elements within the waveguide. The relation between the power reflected due to temperature and to the fluid column diameter is amply demonstrated in FIG. 3. Analysis of this figure indicates that in order to minimize the standing wave ratio of the voltage (VSWR) of the electromagnetic energy within the tubing and hence the reflected power over a desired operating region from about 50° F. to 300° F., a tube diameter of approximately .20 inch is desirable. By selecting a tube diameter which minimizes the VSWR maximum over the desired operating temperature range the task of providing a suitable impedance matching element in the waveguide to reduce the VSWR to an acceptable value is minimized.

FIG. 3 shows the presence of resonant peaks which become larger in magnitude as the tubing diameter is increased. This provides a restriction on the largest size tubing that may be used. On the other hand it is apparent that the VSWR associated with the smaller tubing diameter is very high at the higher temperatures and this provides a limit on the smallest diameter that may be selected. Extensive experiments with tubes having an inside diameter of less than 0.18 inch and greater than 0.22 inch led to the discovery that only tubes having an internal diameter of between 0.18 inch and 0.22 inch function in a practical manner. As a result of this discovery the above described theory was developed to refine the application of this discovery. On the basis of this theory then it is predicted that a tube inner diameter between about 0.18 inch and 0.22 inch is necessary. The theory and this conclusion has since been verified in subsequent experiments.

Referring to FIG. 2, a sectional view with the section taken through the center line of a microwave waveguide, for a further description of the operation of the invention, microwave power in a frequency range of from about 2400 to 2500 megahertz to be converted into thermal energy in the fluid to be heated is propagated by a microwave tube and power supply 21. In a preferred embodiment the energy is propagated in the waveguide in the transverse electric mode. The output energy of the microwave tube passes through a bi-directional coupler 22 which samples both the energy passing toward the load and the energy which may be reflected from the load. The energy passing in one direction is detected in a conventional detecting device 23, such as a crystal or diode detector or bolometer, and the energy passing in the other direction is detected in a similar detecting device 24. The outputs of these two detectors are used to monitor the level of the input power passing into the microwave heat exchanger 11 and to monitor the magnitude of the power reflected from the fluid column and thereby ensure proper operation of the system. The bi-directional coupler does not inhibit the energy flow into subsequent portions of the microwave system since it couples only very loosely to the microwave energy and typically extracts less than .01 percent (%) of the incident or reflected power.

After passing through the bi-directional coupler, the microwave energy enters a waveguide section 24. Passing through the waveguide in a transverse fashion from top to bottom is a glass tube 25 which provides a constraining tubing for the passage of fluid through the electromagnetic energy in the waveguide which is at least translucent to the microwave energy in the waveguide so that the energy is free to interact with the fluid. In a preferred embodiment the tubing is transparent to such microwave energy and is disposed in the waveguide so as to pass therethrough in a direction parallel to the electric field vector within the guide. Since at elevated temperature the loss tangent of the fluid becomes quite low it is important that the tubing containing the fluid be selected from a low loss material so that it does not absorb a noticeable percentage of the microwave energy. It is also important that the wall thickness of this enclosing tube be kept to a minimum and that a material be selected that will withstand a significant temperature. It has been found that among the acceptable materials are Vycor and quartz tubing and that an acceptable wall thickness is 2 mm. or less.

Not shown in FIG. 2 are the means for connecting the fluid into and out of the glass tubing 25. These connections are not critical and any standard method of coupling between metal pipe or metal tubing and glass tubing at the required temperature and pressure is satisfactory.

The tube or column containing the fluid to be heated is passed through circular apertures 26 in the top and bottom walls of the waveguide. These apertures are made slightly larger than the outside diameter of the tube so that they do not restrict the insertion of the tube and yet are made no larger than necessary to retard the possible leakage of energy from the waveguide into the surrounding region. Atttached to the top and bottom walls of the waveguide surrounding tube 25 are two blocks 27 made from a conducting material such as brass, copper, or aluminum. Each is provided with an aperture centered therein mating the aperture in the waveguide so that the tubing 25 passes through the tube blocks 27 as well as the holes 26 in the waveguide. The purpose of these blocks is to provide further suppression of energy which tends to radiate from the apertures in the waveguide. There is a minimum thickness "$h$" associated with these blocks in order to provide the required degree of radiation suppression, said thickness being at least twice the diameter of the tubing for the fluid to be heated. In one embodiment it has been found that an $h$ of $\frac{3}{8}$ inch is satisfactory for a 5 mm. ID times 7 mm. OD Vycor tubing in waveguide operated at 2450 megahertz.

The waveguide 24 is terminated at a point beyond the fluid carrying tube 25 by a shorting plate 28. The distance S from the inner surface of this shorting plate to the center line of the tubing is an important dimension depended upon the nature and desired outlet temperature of the fluid passing through the tube and the frequency of the microwave energy employed in the heater operation. For a system operating at 2450 megahertz and with water flowing through a 5 mm. ID quartz tubing at an exit temperature in the vicinity of 300° F., the desired spacing, S, is .40 inch.

As has been indicated above, the properties of water are functions of frequency and temperature. In order to correct for small deviations in these parameters as well as to compensate for tolerances in the fabrication of the structure a mechanical tuning element 29 has been provided whose insertion in the waveguide can be adjusted so as to minimize reflections from the composite assembly and maximize the electromagnetic energy transformed into thermal energy in the fluid passed through the tubing.

While certain equipments and certain arrangements of these equipments have been described it should be understood that this is merely by way of illustration and various changes in modifications are possible within the scope of this invention and under the scope of the following claims.

What is claimed is:
1. Apparatus for the heating of fluids and fluid materials comprising:
- an electric waveguide,
- means for propagating electromagnetic energy in the waveguide at microwave frequencies in the transverse electric mode,
- a length of tubing passing usbstantially transverse to the direction of propagation in the waveguide, the tubing being constructed of a low loss microwave transparent material having an inner diameter of approximately 0.18 inch to 0.22 inch, the tubing being disposed in the waveguide in an orientation parallel to the electric field vector of the microwave energy,
- means located within the waveguide for adjusting the frequency of the microwave energy propagated in the waveguide,
- shorting means for terminating the waveguide at a location adjacent the side of the tubing opposite the microwave energy propagating means, the location of the shorting means from the tubing being determined by the nature of the fluid to be heated, the desired outlet temperature of the fluid and the frequency of the energy propagated in the waveguide, and
- a conducting tubular member surrounding the fluid conducting tube at a location adjacent the passage of the tubing through the waveguide, the latter tubular member having a thickness of at least twice the diameter of the tubing to prevent the radiation of the energy from the waveguide.

2. Apparatus for the heating of fluids and fluid materials comprising:
- an electric waveguide,
- means for propagating electromagnetic energy in the waveguide at microwave frequencies, said means including a bi-directional coupler and means for detecting the energy transmittted and reflected from an end of the wave guide to allow the energy propagating in the waveguide to be monitored,
- means located within the waveguide for adjusting the frequency of the microwave energy propagated in the waveguide,
- a length of tubing passing substantially transverse to the direction of propagation of the energy in the waveguide, the tubing being constructed of a low loss, microwave transparent material and being disposed in the waveguide in an orientation parallel to the electric field vector of the microwave energy, and
- shorting means for terminating the waveguide at a location adjacent the side of the tubing opposite the microwave energy propagating means, the location of the shorting means from the tubing being determined by the nature of the fluid to be heated, the desired outlet temperature of the fluid and the frequency of the energy propagated in the waveguide.

3. Apparatus for the heating of fluids and fluid materials as defined in claim 2 wherein the inner diameter of the tubing is between 0.18 inch and 0.22 inch and wherein the fluid passing through the tubing is heated in approximately 0.1 second.

References Cited

UNITED STATES PATENTS

| | | | |
|---|---|---|---|
| 2,427,094 | 9/1947 | Evans | 219—10.55 X |
| 2,508,365 | 5/1950 | Bierwirth | 219—10.65 X |
| 2,585,970 | 4/1952 | Shaw | 219—10.65 X |
| 2,958,754 | 11/1960 | Hahn | 219—10.55 |
| 3,171,009 | 2/1965 | Scheller et al. | 219—10.65 X |
| 3,261,959 | 7/1966 | Connell et al. | 219—10.55 |
| 3,277,580 | 10/1966 | Tooby | 219—10.55 X |
| 3,335,253 | 8/1967 | Jeppson et al. | 219—10.55 |

JOSEPH V. TRUHE, Primary Examiner

I. H. BENDER, Assistant Examiner

U.S. Cl. X.R.

219—10.65